(No Model.)

J. R. FINNEY.
CULTIVATOR.

No. 499,187. Patented June 6, 1893.

WITNESSES:
Chas. Nida
Co. Sedgwick

INVENTOR
J. R. Finney
By Munn & Co.
ATTORNEYS.

UNITED STATES PATENT OFFICE.

JOSEPH R. FINNEY, OF RANDOLPH, WISCONSIN.

CULTIVATOR.

SPECIFICATION forming part of Letters Patent No. 499,187, dated June 6, 1893.

Application filed December 10, 1892. Serial No. 454,696. (No model.)

*To all whom it may concern:*

Be it known that I, JOSEPH R. FINNEY, of Randolph, in the county of Dodge and State of Wisconsin, have invented a new and useful Improvement in Cultivators, of which the following is a full, clear, and exact description.

My invention relates to an improvement in cultivators, and has for its object to provide an implement especially adapted for the cultivation of corn and like plants, which machines will be so constructed that when two rows of teeth are employed either of the rows may be raised or lowered independently, or both of them elevated or depressed simultaneously.

Another object of the invention is to swivel or pivot the beams carrying the rows of teeth in such manner to the frame of the machine that when the latter is turned, as at the end of a row for example, the cultivator will not swing over a row to the detriment of the plants to be operated upon.

Another feature of the invention consists in the formation of the cultivator teeth and in the location at the rear of the teeth of hill coverers, which latter are not adapted to enter the ground but to travel over the surface quite close thereto.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in both the views.

Figure 1:
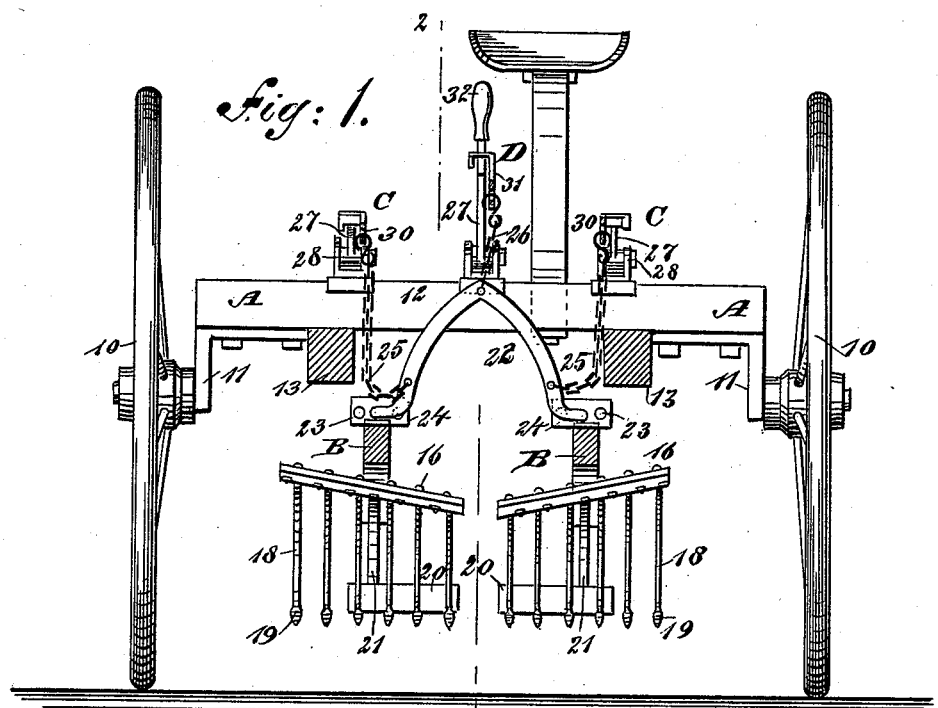
Figure 2:
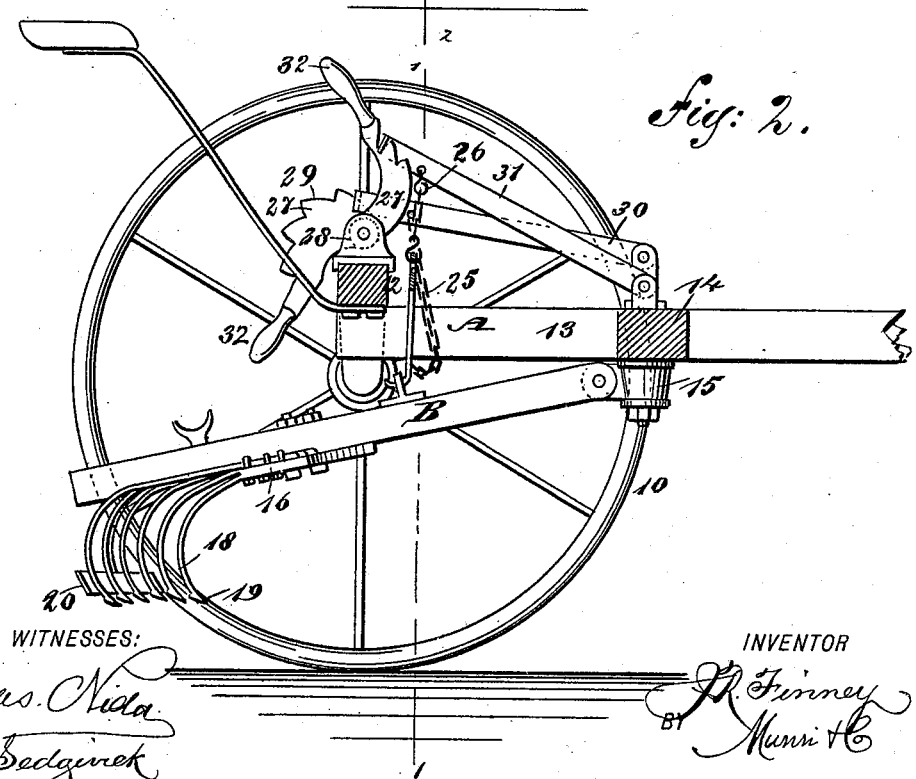

Figure 1 is a transverse vertical section through the machine, taken practically on the line 1—1 of Fig. 2, and loooking in direction of the rear; and Fig. 2 is a longitudinal vertical section taken essentially on the line 2—2 of Fig. 1.

The supporting wheels 10, are mounted upon spud axles 11, and the said axles are attached one at each side of the rear portion of the frame A. The frame comprises an elevated rear beam 12 to which the axles are attached, and this beam is supported by two longitudinal beams 13, the longitudinal beams being attached to the under face of the rear cross beam 12, and said longitudinal beams 13, are connected at their forward ends by a cross bar 14, the forward cross beam 14 being preferably in the same plane with the side or longitudinal beams 13.

A cultivator beam B, is located at each side of the frame A, and each cultivator has practically a swivel attachment to the frame A at its forward end, as is best shown in Fig. 2, in which it will be observed that one of the cultivator beams is pivotally attached to a sleeve or collar 15, the latter being in its turn pivotally connected with the said frame. Each cultivator beam carries near its rear end a head 16. The heads stand somewhat diagonally upon the cultivator beams and are preferably secured to their under faces. In these heads the upper ends of series of cultivator teeth 18 are rigidly attached. The cultivator teeth are of spring material, preferably round spring bars similar to rake teeth, and are curved rearwardly and downwardly, terminating at their lower ends in spear like blades 19 also forwardly inclined. When the teeth are thus formed of a spring material and each tooth is in one piece, and especially when their lower ends are formed with the spear-like blades 19, the ground to be cultivated is not lifted up in lumps, as is the case with many cultivators, especially those having broad blades, but the ground is not only thoroughly pulverized as the teeth pass over it but the pulverized ground is directed in small particles to the place where it is intended to be carried.

In order that the ground may be leveled after the teeth have passed over it, and also that suitable covering may be effected when desired, a hiller 20, is located at the rear of each set of teeth, and each of these hillers consists of a blade having a slant in a vertical direction and located in such manner that it crosses the teeth, extending virtually from one end of a set to the other, the hiller being secured to the heads by one or more rearwardly-curved stays 21, preferably of a spring-like character. These hillers are not intended to enter the ground as their lower edges are located some distance above the blades 19 of the cultivator teeth.

The cultivator beams may be carried far apart or may be carried close together through the medium of an arch 22, the ends of the members of the arch being fitted to enter in one of a series of apertures 23, produced in plates or blocks 24, one of the latter being attached to each cultivator beam. Either end of the arch may be raised or lowered through the medium of chains 25, connected with the arch near where it joins the blocks 24; and the upper ends of these chains are respectively connected with a shifting mechanism C, located upon the upper cross beam 12 of the main frame. The chains 25 are adapted to limit the downward movement of the cultivator beams, and thus regulate the distance the teeth shall travel in the ground; and both of the beams are raised collectively in order that the machine may be taken from the field for example, by means of a third shifting device D, which is connected by a chain 26 with the central portion of the arch.

Each of the shifting devices consists of a cam 27, pivoted in a support 28, secured upon the main frame; and each cam is provided in one of its surfaces with a series of notches 29, and each chain 25 and 26 is attached to bars, the chains 25 to bars 30 pivoted upon the frame, and the central chain 26 with an intermediate bar 31 pivoted likewise on the frame, and each of these bars is provided at its rear end with a head adapted to engage with the notches upon one of the cams 27. Each cam is provided with a handle 32 whereby it may be manipulated, and by raising and lowering these cams the bars 30 and 31 are likewise raised or lowered, and the cultivator beams or beam treated in like manner. The notches in the cams are so made that the weight of the cultivator arms or beams will be sufficient to hold the latch bars 30 and 31 in proper position with respect to the cams. The two outside notched cams are alike and their use is to regulate the depth the cultivator teeth are to go into the ground; and as heretofore stated the inside cam is for the purpose of raising or lowering all of the teeth at once. This cam has but two notches; the first notch is located correspondingly to the first notch in the side cams, but the second or last notch is a locking notch, as the latch bar 31, is made to engage with this notch when the arch 21 has been raised sufficiently upward to carry all the teeth some distance above the ground.

The form of teeth 18, shown and described, operate equally well in hard dry soil or in wet low lands, and serve at all times to throw up the dirt in small particles, leaving the ground like a garden bed.

Having thus described my invention, I claim as new and desire to secure by Letters Patent—

1. The combination with the wheeled frame and the cultivator bars B B having a universal connection at their forward ends with the frame and provided on their upper sides with transverse brackets 24 each having a series of apertures 23 of a yoke adjustably suspended at its middle from the frame and having hooks on its lower ends to detachably engage said apertured brackets to space the bars, and auxiliary adjusting devices on the frame separate and independent from each other and from said middle adjusting devices and connected with the ends of the yoke for imparting independent adjustment to the bars B, substantially as set forth.

2. In a cultivator, the combination, with a frame, cultivator beams or arms having a swivel connection with the frame, and a head carried by each of the beams, of spring teeth rearwardly and downwardly curved, emanating from the head and terminating in spear-like blades, an arch adjustably connecting the cultivator beams or arms, and three separate and independent lifting mechanisms respectively connected with the central portion of the arch and its end portions, as and for the purpose set forth.

3. In a cultivator, the combination, with a frame, cultivator beams or arms connected with the frame and extending rearwardly beyond it, heads attached to the beams or arms, and spring teeth rearwardly and downwardly curved from the heads, of hiller blades located at the rear of each set of teeth, the lower edges of the hiller blades being above the line of the blades of the teeth, an adjustable connection between the cultivator beams or arms, and three separate and independent lifting devices connected with the ends of the beam adjusting medium and respectively with the central portion of said medium, as and for the purpose set forth.

4. In a cultivator, the combination, with a frame, cultivator arms or beams having a swivel connection with the frame, and teeth carried by the said cultivator beams or arms, of an arch adjustably connecting the said beams or arms, cams located upon the frame and provided with notches in one of their sides, one cam being independent of the other, latch bars pivoted upon the frame and engaging with the notches on the cams, and a connection between the latch bars and the arch at the ends and at the center of the latter, substantially as specified.

JOSEPH R. FINNEY.

Witnesses:
ROGER WILLIAMS,
JEMS HANSON.